United States Patent
Erol et al.

(10) Patent No.: US 12,333,703 B2
(45) Date of Patent: Jun. 17, 2025

(54) SELF-SUPERVISED ANOMALY DETECTION FRAMEWORK FOR VISUAL QUALITY INSPECTION IN MANUFACTRUING

(71) Applicant: Siemens Aktiengesellschaft, Munich (DE)

(72) Inventors: Baris Erol, Rochester Hills, MI (US); Jason Dube, Windsor (CA)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 18/857,046

(22) PCT Filed: May 31, 2022

(86) PCT No.: PCT/US2022/031576
§ 371 (c)(1),
(2) Date: Oct. 15, 2024

(87) PCT Pub. No.: WO2023/234930
PCT Pub. Date: Dec. 7, 2023

(65) Prior Publication Data
US 2025/0117920 A1    Apr. 10, 2025

(51) Int. Cl.
*G06T 7/00* (2017.01)
*G06V 10/42* (2022.01)
(Continued)

(52) U.S. Cl.
CPC ............ *G06T 7/0004* (2013.01); *G06V 10/42* (2022.01); *G06V 10/774* (2022.01); *G06V 10/82* (2022.01); *G06T 2207/30108* (2013.01)

(58) Field of Classification Search
None
See application file for complete search history.

(56) References Cited

U.S. PATENT DOCUMENTS

2020/0111204 A1* 4/2020 Cosatto ................ G06T 7/0004
2021/0374928 A1* 12/2021 Hida .................... G06F 18/2148
(Continued)

OTHER PUBLICATIONS

Zhang, R., Isola, P. and Efros, A.A., Oct. 2016. Colorful image colorization. In European conference on computer vision (pp. 649-666). Springer, Cham.
(Continued)

*Primary Examiner* — Leon Flores

(57) ABSTRACT

An AI-based method for visual inspection of parts manufactured on a shop floor includes acquiring a set of real images of nominal parts manufactured on the shop floor to create training datasets. A self-supervised pre-trainer module is used to pre-train a loss computation neural network in a self-supervised learning process using a first dataset on pretexts defined by real-world conditions pertaining to the shop floor. The first dataset is labeled by automatically extracting pretext-related information from image metadata. A main anomaly trainer module is used to train a main anomaly detection neural network to reconstruct a nominal part image from an input manufactured part image in an unsupervised learning process using a second dataset. The main anomaly training measures a perceptual loss between an input image and a reconstructed image by measuring a difference between feature representations thereof at one or more layers of the pre-trained loss computation neural network.

20 Claims, 6 Drawing Sheets

(51) Int. Cl.
*G06V 10/774* (2022.01)
*G06V 10/82* (2022.01)

(56) References Cited

U.S. PATENT DOCUMENTS

| | | | |
|---|---|---|---|
| 2022/0156910 A1* | 5/2022 | Tan | G06T 7/0004 |
| 2022/0244194 A1* | 8/2022 | Perron | G01N 21/8851 |
| 2022/0262108 A1* | 8/2022 | Hida | G06N 3/088 |

OTHER PUBLICATIONS

Johnson et al., "Perceptual Losses for Real-Time Style Transfer and Super-Resolution", European Conference on Computer Vision, 2016, pp. 1-18.

Bergmann, Paul et al: "Improving Unsupervised Defect Segmentation by Applying Structural Similarity to Autoencoders"; arxiv.org, Cornell University Library, 201 Olin Library Cornell University Ithaca, NY 14853, Jul. 5, 2018 (Jul. 5, 2018), XP081244379.

Pathak, Deepak et al.: "Context Encoders: Feature Learning by Inpainting"; in: Conference: 2016 IEEE Conference on Computer Vision and Pattern Recognition; pp. 2536-2544; 2016; DOI: 10.1109/CVPR.2016.278.

Noroozi, Mehdi, and Paolo Favaro. "Unsupervised learning of visual representations by solving jigsaw puzzles." European conference on computer vision. Springer, Cham, 2016.

\* cited by examiner

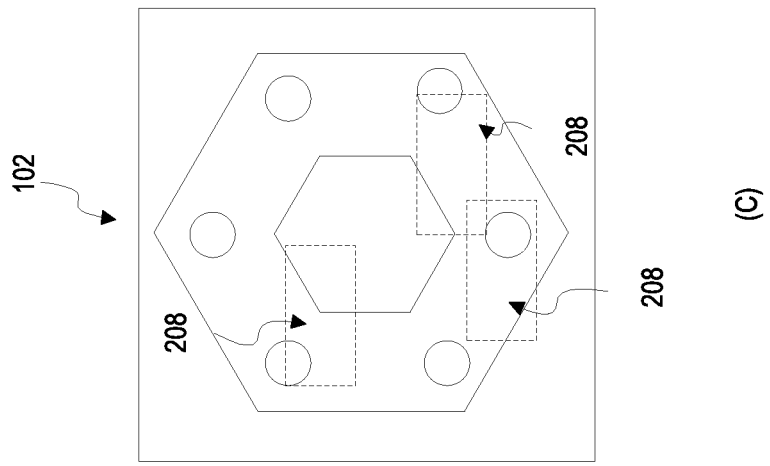
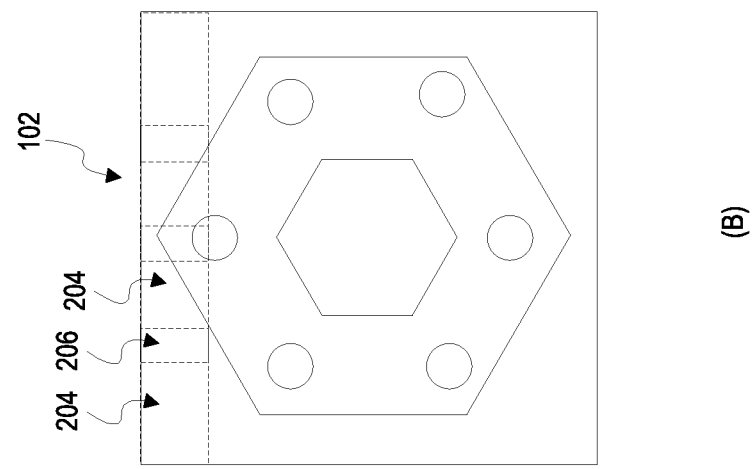
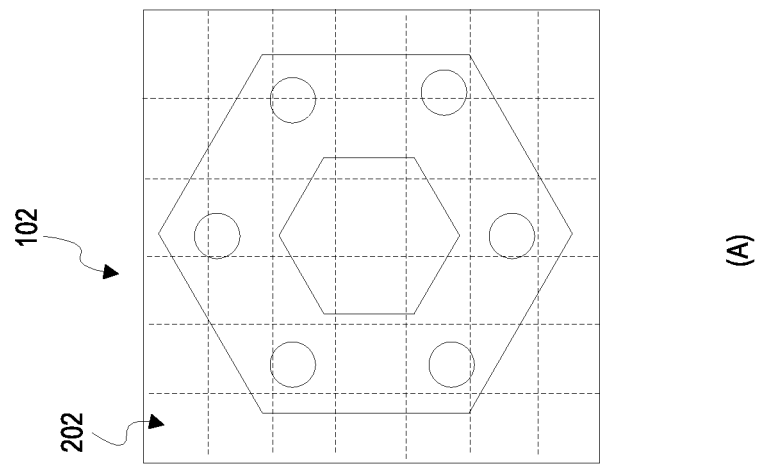
FIG. 2

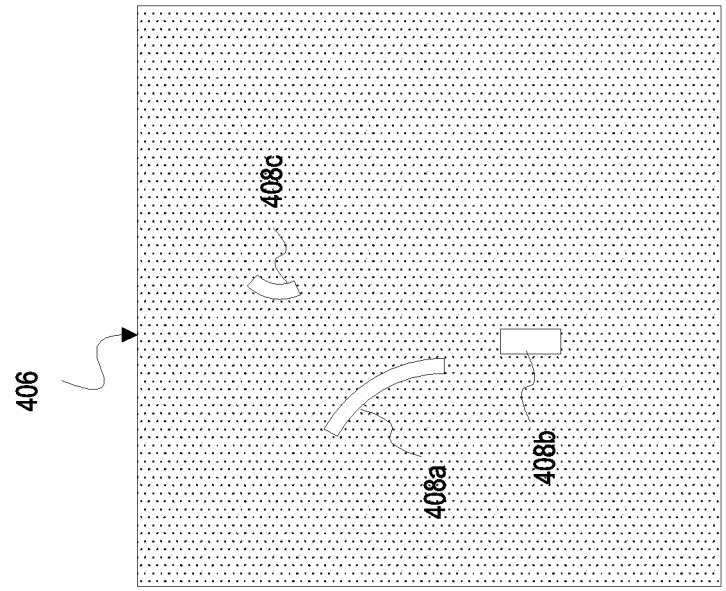
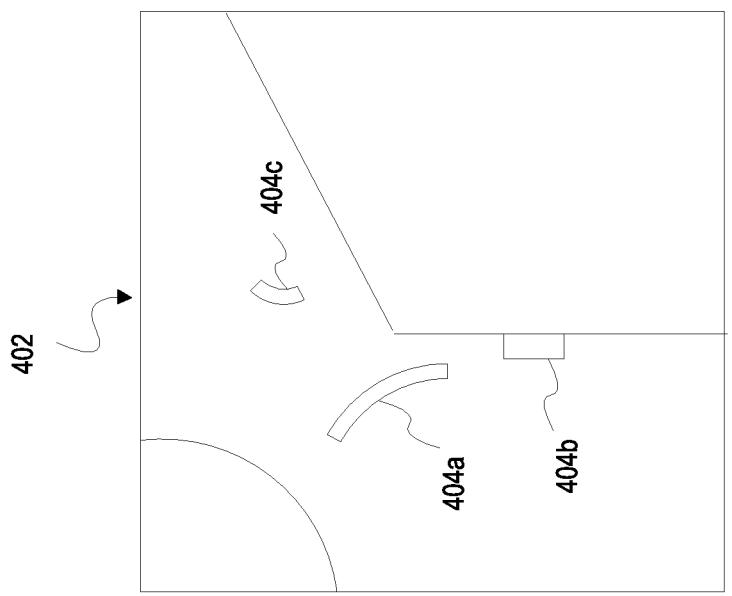
FIG. 4

SELF-SUPERVISED ANOMALY DETECTION FRAMEWORK FOR VISUAL QUALITY INSPECTION IN MANUFACTRUING

TECHNICAL FIELD

The present disclosure relates to computer vision systems for visual quality inspection of parts manufactured in a production line. Embodiments of the disclosure specifically relate to an improved technique to detect defects in manufactured parts in a production line based on artificial intelligence implemented anomaly detection, in particular, using a self-supervised anomaly detection framework.

BACKGROUND

Many modern production lines operate on a large scale of production, leading to very low cycle times for human operators to effectively inspect manufactured parts for defects. Recent advancements in the field of artificial intelligence (AI) make it possible to employ deep learning models to tackle this challenge. Computer vision systems are commonly used in manufacturing environments in different industries such as automotive, aerospace, food & beverage, packaging, etc. These systems may be typically designed and implemented as end-of-line stations, where a main objective is to inspect and monitor the visual appearance of parts produced in a production line.

In particular, deep learning-based computer vision models, such as convolutional neural networks (CNN), have been utilized in a growing number of studies to detect defects, such as for inspection of cemented surfaces, industrial products, etc. Especially, CNNs may be particularly suitable for detecting defects based on object detection, image segmentation and classification. One reason for the tremendous progress of deep learning-based models in computer vision is that they can learn in a supervised learning process from massive amounts of carefully labelled image data. This paradigm of supervised learning has a proven record for training specialist models that can perform extremely well on the task they were trained to do.

However, there is a limit on the suitability of deep learning-based computer vision models in detecting defects in a manufacturing environment with supervised learning alone.

First, in an industrial environment, defects may occur rarely, for example, once or twice during an entire shift. Moreover, "defective" image data must be labelled manually (e.g., via bounding box or segmentation), typically by one or more domain experts on the floor. Therefore, creating a large enough dataset consisting of images of defective parts to train these models robustly can involve an extremely long data collection period (e.g., about six months) and can also be labor intensive, which can create an additional workload and may change the process flow that can be problematic for legacy manufacturers. Manual labelling is also subjective and may not be consistent over a very large dataset and long data collection period.

Secondly, while the supervised learning methods can be good at capturing known defects and defects located in similar regions on a part, they cannot be used to accurately detect any unknown type of defect or known defects showing up in different regions of the part. This ties back again into the variance of the training data mentioned above. Furthermore, in industrial vision applications, within class (defect) variance is also typically high. There might be multiple subclasses under one main defect category. For example, a defect class, which relates to a subcomponent of the manufactured part, may have sub-classes such as a) the subcomponent is missing, b) the subcomponent is placed incorrectly and c) the subcomponent is not soldered properly. In the absence of representative data during model training, these supervised models tend to have a lower accuracy.

Considering the current status of AI research and complexity of the industrial applications, there is a need for a novel and domain-independent solution.

SUMMARY

Briefly, aspects of the present disclosure provide an improved technique to detect defects in manufactured parts on a shop floor based on artificial intelligence implemented anomaly detection using a self-supervised anomaly detection framework.

A first aspect of the disclosure provides a method for artificial intelligence-based visual quality inspection of parts manufactured on a shop floor. The method comprises acquiring a set of real images of nominal parts manufactured on the shop floor. The method further comprises executing a self-supervised pre-trainer module to pre-train a loss computation neural network in a self-supervised learning process using a first dataset created from the acquired set of real images. The loss computation neural network is pre-trained on pretexts defined by real-world conditions pertaining to the shop floor, the first dataset being labeled by automatically extracting pretext-related information from image metadata. The method further comprises executing a main anomaly trainer module to train a main anomaly detection neural network to reconstruct a nominal part image from an input manufactured part image in an unsupervised learning process using a second dataset created from the acquired set of real images. The unsupervised learning process comprises using the main anomaly detection neural network for processing input images from the second dataset to output respective reconstructed images and measuring therefrom a reconstruction loss to be minimized. The reconstruction loss includes a perceptual loss that is measured by feeding each input image and the respective reconstructed image to the pre-trained loss computation neural network and computing a measure of the difference between feature representations of the input image and the respective reconstructed image at one or more layers of the pre-trained loss computation neural network.

Other aspects of the disclosure implement features of the above-described method in a computer program product and a computing system.

Additional technical features and benefits may be realized through the techniques of the present disclosure. Embodiments and aspects of the disclosure are described in detail herein and are considered a part of the claimed subject matter. For a better understanding, refer to the detailed description and to the drawings.

BRIEF DESCRIPTION OF THE DRAWINGS

The foregoing and other aspects of the present disclosure are best understood from the following detailed description when read in connection with the accompanying drawings. To easily identify the discussion of any element or act, the most significant digit or digits in a reference number refer to the figure number in which the element or act is first introduced. For clarity, some of the images herein are schematically represented as line drawings.

FIG. 2 schematically illustrates extraction of patches from an image of a manufactured part to create datasets for pre-trainer and main trainer modules according to disclosed embodiments.

FIG. 4 schematically illustrates an example of generation of a loss map from an acquired image by the anomaly detector module.

DETAILED DESCRIPTION

In data science, "anomaly detection" refers to a process of identifying unexpected items or events in datasets, which differ from the norm. Anomaly detection is usually based on the assumptions that anomalies occur rarely in the data and that their features differ from the normal or "nominal" instances significantly. The disclosed methodology can be used to train a neural network to detect a defect in a manufactured part in a production line from an acquired image of the manufactured part by detecting an anomaly. Such a neural network is referred to herein as an anomaly detection neural network. The disclosed methodology can obviate the need for "defective" data in the training process as the model training can be implemented using only nominal (i.e, defect-free) data, which is abundantly available. The trained neural network can thereby detect any defect, such as split, crack, scratch, missing components, incorrectly assembled components, etc., without having to be trained with the knowledge of any specific type of defect.

From experimentation with multiple industrial use-cases, the present inventors recognize that anomaly detection models can be very sensitive to environmental and operational changes, such as lighting changes, changes in orientation (rotation) of the manufactured parts, adaptation to unseen parts, etc. The disclosed methodology can address the above challenges by using a self-supervised anomaly detection framework, providing a robust, reliable and generalizable solution for anomaly detection for industrial use-cases.

As per disclosed embodiments, a self-supervised anomaly detection framework is based on pre-training a loss computation neural network in a self-supervised process using pretexts defined by real-world conditions pertaining to the shop floor (e.g., environmental conditions, operational conditions, camera conditions, etc.) to learn feature representations of image data. Creating pretexts based on real-world conditions on the shop floor can ensure that the learned representations are robust to varying conditions on the shop floor. The self-supervised learning process may be executed based on image labels generated by automatically extracting pretext-related information from image metadata. The pre-trained loss computation neural network is used in a downstream task of training a main anomaly detection neural network for computing a perceptual loss between input images and corresponding reconstructed images by measuring a difference between feature representations thereof at one or more layers of the loss computation neural network. The perceptual loss may form part of a reconstruction loss function to be minimized by the process of training the main anomaly detection neural network.

Figure 1:
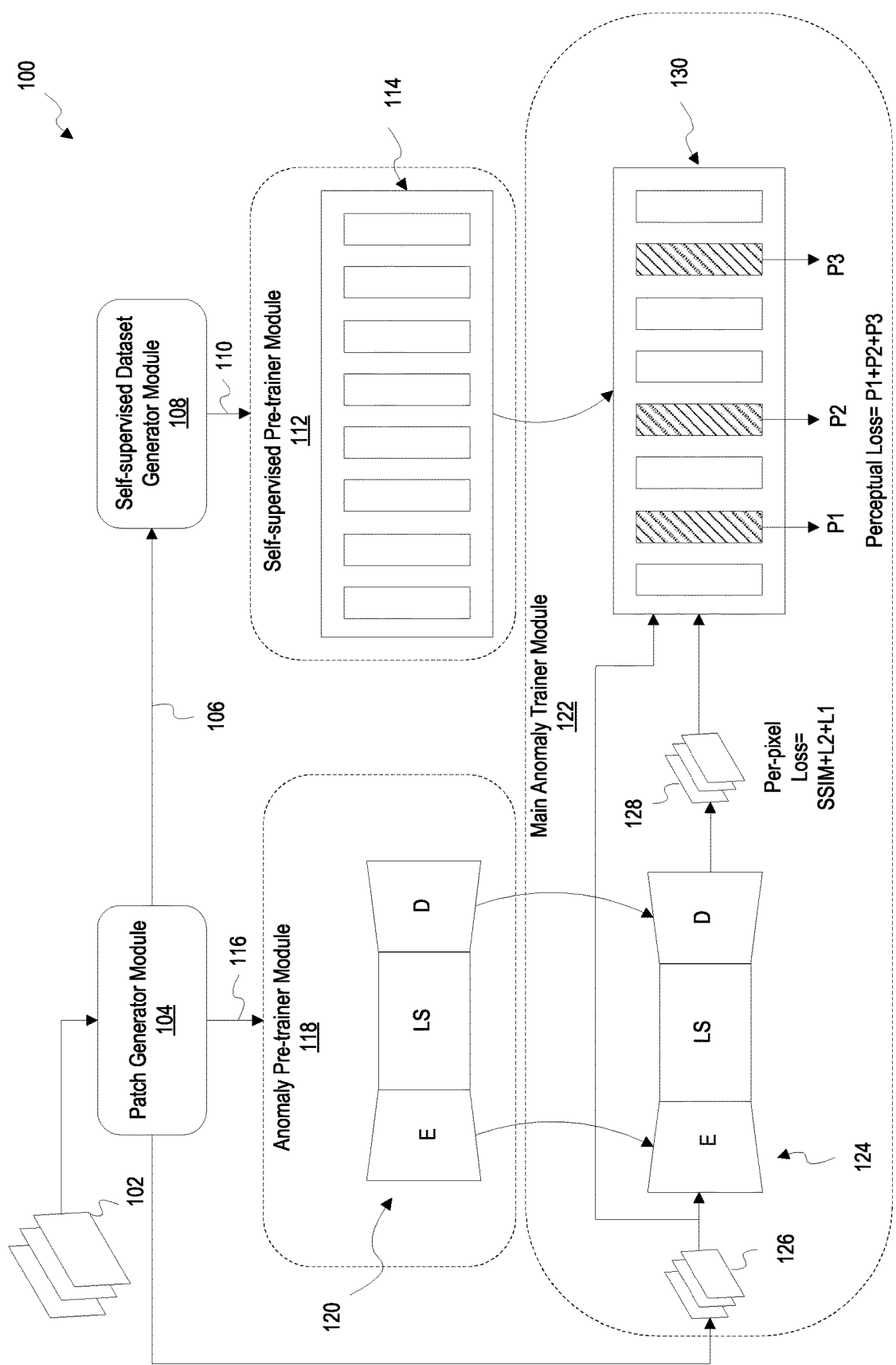
FIG. 1 is a schematic diagram illustrating a pipeline for training an anomaly detection neural network for visual quality inspection of manufactured parts on a shop floor, according to one embodiment of the disclosure.

Turning now to the disclosed embodiments, FIG. 1 illustrates an example pipeline 100 for training an anomaly detection neural network for visual quality inspection of manufactured parts on a shop floor. The various modules, such as the patch generator module 104, the self-supervised dataset generator module 108, the self-supervised pre-trainer module 112, the anomaly pre-trainer module 118 and the main anomaly trainer module 122, described herein, including components thereof, may be implemented by a computing system in various ways, for example, as hardware and programming. The programming for the modules 104, 108, 112, 118, 122 may take the form of processor-executable instructions stored on non-transitory machine-readable storage mediums and the hardware for the engines may include processors to execute those instructions. In embodiments, the computing system may suitably comprise a workstation having multiple graphics processing units (GPU).

Referring to FIG. 1, the disclosed methodology involves acquiring a set of real images 102 of actual parts manufactured on the shop floor, for example via a production line camera on the shop floor. The images 102 may pertain only to manufactured parts that are nominal (i.e., free from defects). The acquired set of real images 102 may be used to create training datasets, for example, as illustrated below. The images 102 may suitably cover a wide range of real-world conditions of the shop floor.

Many industrial applications require a high-resolution camera to capture small defects or flaws. For example, camera resolutions may be set at 3K for imaging die-cast parts, at 16K for imaging stamped parts, at 8K for imaging a motherboard, etc. Most state-of-the-art AI-based vision models are not designed to take such high-resolution images as inputs. This is due to the receptive fields and kernel filter sizes defined in the convolutional layers of the neural network. One work-around could be to downsize the images to a more manageable resolution. However, downsizing may also cause the "defect" pixels to disappear.

In accordance with the disclosed embodiment, a patch generator module 104 may be used to extract patches from individual whole images in the acquired set of real images 102. The patch generator module 104 can split a high-resolution image into smaller images or patches (having reduced number of pixels) that can be processed by a state-of-the-art neural network. As per this embodiment, the patches extracted by the patch generator module 104 may be used to create the training datasets for the pre-trainer modules 112, 118 and the main anomaly trainer module 122. In some embodiments, depending on the resolution of the acquired images 102 and/or the architecture of the neural network, a patch generator module 104 may not be needed and the training datasets may be created using the whole images 102.

The patch generator module 104 may be capable of applying one or multiple different modalities for extracting patches from an image. According to an exemplary embodiment disclosed herein, patches may be extracted as ordered positional embeddings, overlap positional embeddings and random positional embeddings. The number and size of patches may be defined based on user-specified parameters in each case. FIG. 2 illustrates application of these modalities on an image 102 of a part manufactured on the shop floor. The image depicted in FIG. 2 is merely illustrative (i.e., not a real image), being schematically represented as a line drawing for clarity.

Referring to FIG. 2, according to a first modality (A), a set of ordered or non-overlapping patches may be extracted from a whole image 102 by dividing the image 102 based on a specified number of rows and columns (i.e., number of patches along the length and width of the image). The extracted patches 202 are referred to as ordered positional embeddings. According to a second modality (B), a set of overlapping patches may be extracted from a whole image 102 by defining a sliding window based a specified patch size (pixel dimensions) and an overlap degree (e.g., percentage or number of pixels). The extracted patches 204 are referred to as overlap positional embeddings. The overlap between adjacent patches 204 is designated as 206. The overlap degree may be specified along both directions (X and Y axes). According to a third modality (C), a set of random patches may be extracted from a whole image 102 based on a specified patch size (pixel dimensions) and number of patches. The patches 208, referred to as random positional embeddings, may be extracted randomly with or without overlap with other patches.

Continuing with reference to FIG. 1, the patch generator module 104 may thus be used to extract, for each image 102, one or multiple sets of patches corresponding to one or more modalities (e.g., as illustrated above). Extracted patches may be provided as inputs to the pre-trainer and main trainer modules. For example, ordered and overlap positional embeddings may be used as images in the respective datasets for the self-supervised pre-trainer module 112 and the main anomaly trainer module 122. Using both ordered and overlapping patches in the datasets for the self-supervised pre-trainer module 112 and the main anomaly trainer module 122 can provide increased robustness to the trained models. In some embodiments, only ordered positional embeddings may be used as images in the datasets for the self-supervised pre-trainer module 112 and the main anomaly trainer module 122, in which case the modality of extracting overlap positional embeddings may not be necessary. Random positional embeddings may be used as images in the dataset for the anomaly pre-trainer module 118. In embodiments where the anomaly pre-trainer module 118 is not used, the modality of extracting random positional embeddings may not be necessary in the patch generator module 104. The patches in each of the datasets for the self-supervised pre-trainer module 112, the anomaly pre-trainer module 118 and the main anomaly trainer module 122 may be derived from different subsets of real images in the acquired set of real images 102. The overlap between these subsets may be suitably determined to avoid model overfitting.

Consistent with the disclosed embodiment, the self-supervised dataset generator module 108 may use ordered and overlap positional embeddings 106 extracted from a first subset of the acquired set of real images 102 to create a self-supervised dataset 110. To create the dataset 110, the self-supervised dataset generator module 108 may automatically generate image labels by extracting information from image metadata based on pretexts associated with the self-supervised pre-training.

Briefly described, self-supervised learning is a method of machine learning which may involve learning useful representations of data from an unlabeled pool of data using self-supervision during a pre-training process, with the goal of subsequently fine-tuning the representations in a downstream task that can be supervised or unsupervised. In the present application, the downstream task includes an unsupervised anomaly detection task. In self-supervised learning, the task that is used for pre-training is referred to as "pretext". An important aspect of self-supervised learning is the establishment of the pretext. In current research, the most common methods to establish pretexts include augmentation of the unlabeled data pool using methods such as colorization, changing locations of the patches, inpainting, adding corrupted images, adding synthetic rotations into the images, etc. However, it is recognized that in an industrial application, and particularly in the context of anomaly detection, these augmentations techniques may not provide useful optimization characteristics during model pre-training.

The disclosed methodology involves an inventive technique of establishing pretexts for self-supervised pre-training that are defined by real-world conditions pertaining to the shop floor. This is distinct from the above-mentioned augmentation techniques which are synthetically generated after data collection. The pre-training task may thus include inputting an image (in this case, a patch 106) to a neural network to infer a real-world condition of the shop floor associated with the image, using the self-supervised dataset 110. To learn subtle differences, the objective of the self-supervised training may be made more complex, for example by selecting multiple "real-world" pretexts that may be pertinent in the context of the specific industrial use-case. The real-world conditions for defining the pretexts may include one or more environmental conditions, operational conditions, camera conditions, or preferably, any combination thereof.

Since end-of-line inspection stations are dynamic in nature, e.g., involving changing machine conditions, ambient lighting conditions, different parts, different trigger locations etc., such conditions can be utilized as pretext tasks for model pre-training. Taking a first example use-case of inspecting a part manufactured by stamping, a pretext table may be visualized (see Table 1) including three real-world condition categories: (1) environmental, (2) camera and (3) operational conditions. Each of these categories can include multiple pretexts with an assigned difficulty score. The number of subtasks indicate the number of possible outcomes associated with a given pretext.

TABLE 1

| Condition Category | Pretext | Difficulty Score | No. of subtasks |
|---|---|---|---|
| Environmental | Ambient lighting | 5 | 3 (morning, afternoon, night) |
|  | Production line ID | 5 | 9 (Press 1 to 9) |
|  | Manufacturing date | 5 | 4 (4 seasons) |
| Camera | Exposure value | 2 | 2 (500 and 1000) |
|  | Analog gain | 2 | 2 (1 and 5) |
|  | Camera ID | 1 | 5 (5 cameras) |
|  | Trigger ID | 1 | 3 (3 triggers) |
| Operational | Die condition | 4 | 2 (average and good) |
|  | Conveyor speed | 4 | 2 (1 m/s and 0.5 m/s) |
|  | Job ID | 1 | 2 (Job 1 and 2) |
|  | Part ID | 5 | 40 (Parts 1 to 40) |

Note that the difficulty score can be indicative of the level of complexity of the defined pretext. Here, a difficulty score of 5 indicates the highest complexity while a difficulty score of 1 indicates the least complexity. For example, the pretext "ambient lighting" is assigned a difficulty score of 5 for involving a highly complex task because the mechanical system may be designed to block/reduce any of the ambient lighting reflections. Hence it can be assumed that the changes from morning to afternoon should be minimum. Therefore, capturing the differences between samples from different shifts would be a hard task for the pre-training model. On the other hand, the pretext "camera ID" is assigned a difficulty score of 1 for involving a simple task since each camera sees a different region of the part with some degree of overlapping (e.g., 20%).

Taking a second example use-case of inspecting a manufactured motherboard, a pretext table may be visualized (see Table 2) that includes two real-world condition categories: (1) environmental, and (2) operational conditions. Each of these categories can similarly include multiple pretexts with an assigned difficulty score. The number of subtasks indicate the number of possible outcomes associated with a given pretext

TABLE 2

| Condition Category | Pretext | Difficulty Score | No. of subtasks |
|---|---|---|---|
| Environmental | Ambient lighting | 5 | 3 (morning, afternoon, night) |
| | Plant location | 5 | 2 (Plant 1 and 2) |
| | Manufacturing date | 5 | 4 (4 seasons) |
| Operational | PC version | 1 | 2 (Version 1 and 2) |
| | Fixture position | 3 | 2 (with and without) |
| | Assisting operator | 2 | 2 (Operator 1 and 2) |
| | Assisting ID station | 1 | 2 (Station 1 and 2) |

In one embodiment, the objective of the self-supervised pre-trainer module 112 may be generated using a combination of pretexts, where the pretexts may be selected from one or multiple of the real-world condition categories (e.g., environmental conditions and/or operational conditions and/or camera conditions pertaining to the shop floor). Referring to the use-case shown in Table 1, an example pre-training objective may involve the task of inferring the "ambient lighting" and "exposure value" and "die condition" associated with an input image or patch 106 (a total of 3×2×2=12 inference outcomes). A combination of multiple pretexts may lead to a tighter feature space in the pre-trained model. The self-supervised dataset generator module 108 may be configured to extract the pertinent pretext-related information from image metadata of the images/patches 106 to generate image labels. Note that the image labels for each patch 106 extracted from a single real image 102 would be identical, since the metadata of a given image 102 is common to all patches 106 extracted from that image 102.

In a further embodiment, the objective of the self-supervised pre-trainer module 112 may be generated (either manually or automatically) by combining pretexts based on a specified overall difficulty score. In an example implementation, based on a user-specified overall difficulty score, a graph-based algorithm may be employed to structure the self-supervised dataset 110 by automatically selecting a combination of pretexts that would satisfy the user input.

The self-supervised pre-trainer module 112 may be executed to pre-train a loss computation neural network 114 using the self-supervised dataset 110 which comprises labels generated from pretext information. The objective of the pre-training may be based on multiple pretexts, as described above. For example, the pre-training objective may involve the task of inferring a combination of real-world conditions on the shop floor associated with an input image or patch. The loss computation neural network 114 may suitably comprise a number of convolutional layers as shown, which, on pre-training, may be configured to map multiple levels of feature representations of the input images or patches by learning to encode perceptual and semantic information. The loss computation neural network 114 may comprise, for example, a state-of-the-art architecture. In one non-limiting embodiment, the loss computation neural network 114 may be implemented by a deep residual neural network architecture, such as Resnet50. The output of the self-supervised pre-trainer module 112 may comprise a pre-trained (and validated) loss computation neural network 130, which may be utilized subsequently by the main anomaly trainer module 122.

As an additional feature, it may be beneficial to bring the power of transfer learning to the anomaly detection framework. Transfer learning involves taking a pre-trained neural network and adapting it to a new task. However, because of the architecture of the anomaly detection neural network, there are no available pre-trained models that can be directly used in the main anomaly trainer module 122. One solution to the above may involve using an anomaly pre-trainer module 118 in accordance with a further embodiment of the disclosed methodology.

The anomaly pre-trainer module 118 may be executed to pre-train a candidate anomaly detection neural network 120 from scratch (i.e., without requiring prior initialization of weights), using a dataset comprising random patches 116 (random positional embeddings) extracted from a second subset of the acquired set of real images 102. The candidate anomaly detection neural network 120 may have an identical architecture to the main anomaly detection neural network 124 that is to be trained subsequently.

In the disclosed embodiment, the candidate and main anomaly detection neural networks 120, and 124 have an (identical) autoencoder architecture that is particularly suited to learning encodings of unlabeled data, such as in anomaly detection. An autoencoder architecture may include an encoder E for encoding or compressing input data into lower dimensional data, represented in a latent space LS, and a decoder D for mapping the lower dimensional data into a reconstruction of the input data. The encoder E and/or decoder D may comprise convolutional layers. The architecture described herein is exemplary, and the neural networks 120, 124 may comprise other architectures, such as vision transformers including multi-layer perceptions, among others.

The anomaly pre-trainer module 118 may execute an unsupervised learning process that involves a task of inputting unlabeled random patches 116 and outputting a reconstruction of the input random patches 116 by minimizing a reconstruction loss (which measures the differences between the input images and reconstructed images). The candidate anomaly detection neural network 120 may be pre-trained with thousands of random patches 116, whereby the model can learn some definitive characteristics of the surface of the manufactured part, such as holes, edges, bending points, curvatures, lighting changes, etc. After pre-training of the candidate anomaly detection neural network 120, the main anomaly detection neural network 124 may be initialized using weights of the pre-trained candidate anomaly detection neural network 120, before executing the main anomaly trainer module 122.

Using the pre-trained candidate anomaly detection neural network's weights to jump start the main anomaly training loop can provide a better loss landscape in the main anomaly training loop. The initialized weights can provide a better starting point for the main anomaly detection neural network 124, allowing it to perform tasks with higher accuracy without prior training. This approach may offer a higher learning rate during the main anomaly training loop since the candidate anomaly detection neural network 120 is trained on a similar problem, based on reconstructing random patches extracted from multiple different parts. As a further feature, due to the random patch extraction, the main anomaly detection neural network 124 can become more robust to changes in the production line, such as parts being rotated, parts being displaced to another location on the conveyor system, etc.

The goal of the main anomaly trainer module 122 is to train a main anomaly detection neural network 124 to reconstruct a nominal part image from an input manufactured part image acquired from the shop floor. Consistent with the disclosed embodiment, the main anomaly trainer module 122 may use a dataset comprising ordered and overlap positional embeddings 126 extracted from a third subset of the acquired set of real images 102. The ordered and overlap positional embeddings 126 may thus define input images in the main anomaly training loop. In one embodiment, the main anomaly detection neural network 124 may be initialized using weights of a pre-trained candidate anomaly detection neural network 120, as described above.

The main anomaly trainer module 122 may execute an unsupervised learning process that involves a task of using the main anomaly detection neural network 124 for processing input images 126 to output respective reconstructed images 128 and measuring therefrom a reconstruction loss to be minimized, the reconstruction loss being an overall measure of the differences between the input images 126 and the reconstructed images 128. The reconstruction loss may include a perceptual loss that may be measured by feeding each input image 126 and the respective reconstructed image 128 to the pre-trained loss computation neural network 130 and computing a measure of the difference between feature representations of the input image 126 and the respective reconstructed image 128 at one or more layers of the pre-trained loss computation neural network 130.

The concept of perceptual losses has been studied in applications, such as image restoration, image super resolution, denoising and colorization, where the input is a degraded image, and the output is a high-quality color image. This includes an optimization technique that has been used for generating images where the objective is perceptual, depending on high-level features extracted from a convolution neural network. For example, the concept of perceptual losses is discussed by Johnson et al. in the publication: Johnson, Justin, Alexandre Alahi, and Li Fei-Fei. *"Perceptual losses for real-time style transfer and super-resolution."* European conference on computer vision. Springer, Cham, 2016.

The disclosed methodology thus provides an inventive technique to adapt the concept of perceptual loss to an anomaly detection framework for an industrial application, to provide accurate reconstructions of images of nominal parts. The presumption is that the output of the self-supervised pre-trainer module 108 (i.e., the pre-trained loss computation neural network 130) has already learned to encode the perceptual and semantic information that would be useful to measure in the reconstruction loss function. Accordingly, the pre-trained loss computation neural network 130 can be used to define a perceptual loss that measures differences in content between input images 126 and reconstructed images 128.

In one embodiment, the perceptual loss at a given depth (i.e., layer) of the pre-trained loss computation neural network 130 may be computed by accessing the activations of that layer corresponding to the input image 126 and the reconstructed image 128 and measuring a Euclidean distance between the feature representations of the input image 126 and reconstructed image 128 defined by the respective activations produced by them at that layer (e.g., as described in the above-mentioned publication by Johnson et al.).

In one embodiment, the perceptual loss may be measured by combining contributions from multiple levels of feature representations respectively at multiple convolutional layers of the pre-trained loss computation neural network 130. This operation may encourage the reconstructed image 128 to be perceptually similar to the input image 126 but does not force them to exactly match. The contribution at each layer may be computed, for example, as described above. In the disclosed embodiment, these contributions include a first contribution P1 associated with low-level feature representations, a second contribution P2 associated with mid-level feature representations and a third contribution P3 associated with high-level feature representations. In this example, the perceptual loss may be computed as a summation of P1, P2 and P3. In various embodiments, contributions may be measured from additional or different layers and combined in different ways (e.g., as a summation or weighted summation) to compute the perceptual loss.

For increased accuracy of reconstructions, the reconstruction loss may be measured by combining the perceptual loss with one or more per-pixel loss measures between the reconstructed image 128 and the input image 126. The per-pixel loss measures may be appropriately determined to force the pixels of the reconstructed image 128 to exactly match the pixels of the input image 126. As per the disclosed embodiment, the per-pixel loss measures may include a combination (e.g., summation) of a L1 loss measure, a L2 loss measure and a structural similarity index measure (SSIM) of the main anomaly detection neural network 124. The reconstruction loss may be determined, for example, as a weighted combination (e.g., summation) of the perceptual loss and the per-pixel losses.

In one embodiment, the main anomaly training loop may involve dividing the training dataset into batches of images 126 and measuring the reconstruction loss for each batch of images 126. The main anomaly training loop may proceed by repeatedly adjusting the weights of the main anomaly detection neural network 124 after processing a batch of images 126, until the reconstruction loss is minimized (e.g., based on a method of gradient descent). As illustrated below referring to FIGS. 3-5, the trained (and validated) main anomaly detection neural network may be deployed on a production line to detect a defect on a manufactured part by identifying an anomaly based on a comparison between an input manufactured part image (e.g., acquired by a production line camera) and a reconstructed nominal part image.

Figure 3:
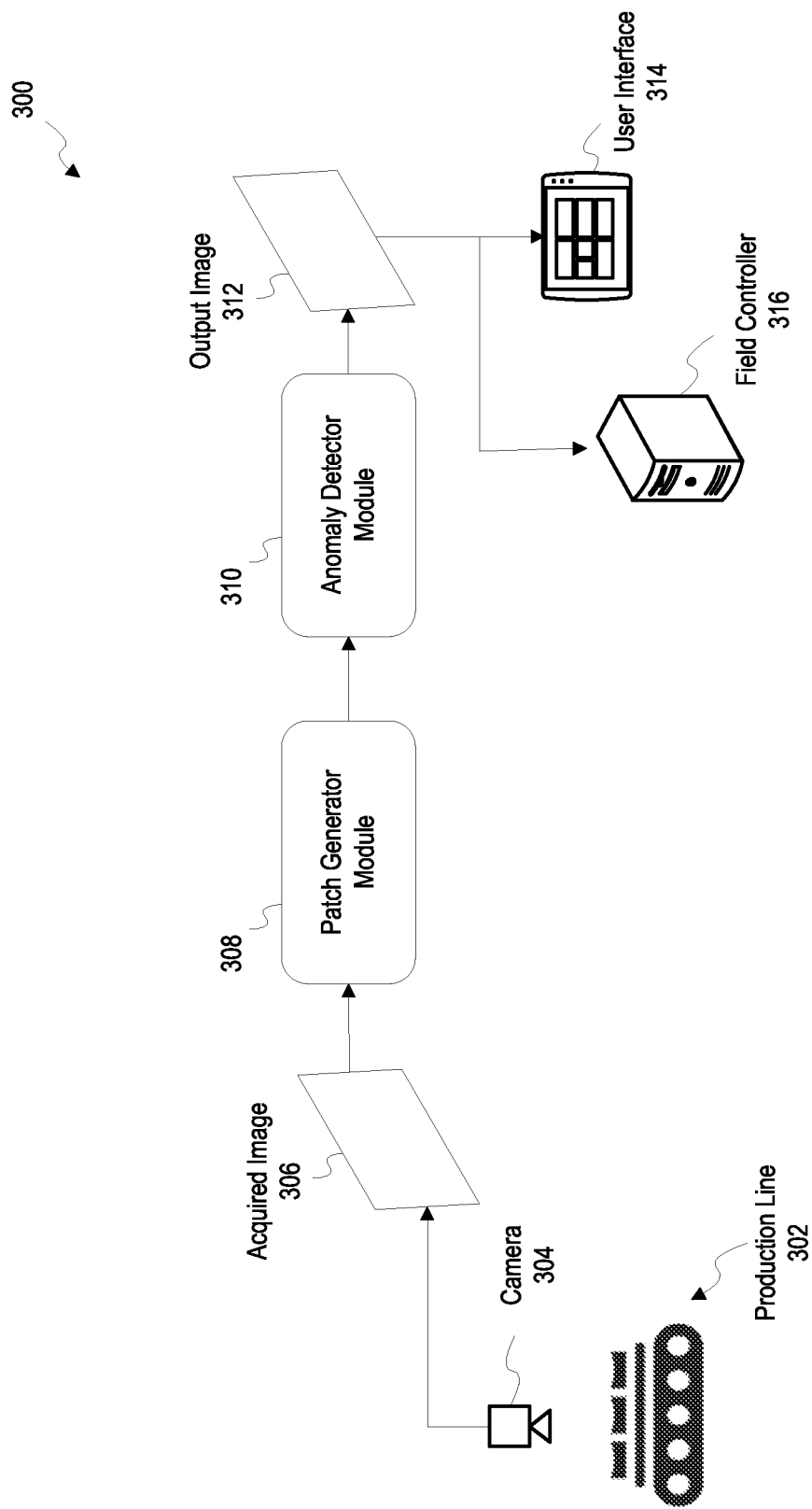
FIG. 3 illustrates an example embodiment of a system for visual quality inspection of manufactured parts on a shop floor using an anomaly detector module comprising a trained anomaly detection neural network.

FIG. 3 shows an exemplary embodiment of a system 300 for visual quality inspection of manufactured parts on a shop floor. The various modules, such as the patch generator module 308 and the anomaly detector module 310, described herein, including components thereof, may be implemented by a computing system (e.g., an industrial PC, edge device, etc.) in various ways, for example, as hardware and programming. The programming for the modules 308, 310 may take the form of processor-executable instructions stored on non-transitory machine-readable storage mediums and the hardware for the engines may include processors to execute those instructions. In one suitable implementation, such a computing system may comprise an industrial PC, an edge device, or another type of computing device that may be provided with one or more processors such as GPUs or deep learning processors such as neural processing units (NPU) to run the deployed anomaly detection neural network in a computationally efficient fashion.

Referring to FIG. 3, the system 300 may comprise a camera 304 positioned to acquire images 306 of manufactured parts on a production line 302. The production line 302 may comprise a queue of manufactured parts positioned on a conveyor system. In examples, the manufactured parts may comprise die-cast parts, stamped metal parts, motherboards, among others. During operation of the production line 302, the camera 304 may be used to acquire an image 306 for each individual manufactured part in the production line 302, which may be used to provide a real time input image for an anomaly detector module 310 that comprises the trained main anomaly detection neural network. The real time input image may be processed by the anomaly detector module 310 using the trained main anomaly detection neural network to reconstruct a nominal part image. The anomaly detector module 310 may detect an anomaly based on measuring a difference between the real time input image and the reconstructed nominal part image as described below.

In the disclosed embodiment, the system 300 suitably includes a patch generator module 308 which may be executed to extract patches from each acquired image 306. The extracted patches for an individual image 306 may comprise, for example, ordered positional embeddings extracted based on a specified number of rows and columns, as illustrated in FIG. 2. Thus, in the disclosed embodiment, each real time input image for the anomaly detector module 310 comprises a patch extracted from the acquired image 306, which may be processed by the trained main anomaly detection neural network to reconstruct a respective nominal part image corresponding to that patch. In certain embodiments, depending on the resolution of the acquired images 306 and/or the architecture of the main anomaly detection neural network, the real time input images for the anomaly detector module 310 may comprise whole images 306 acquired by the camera 304.

FIG. 4 shows an example of a patch 402 extracted from an image 306 of a manufactured part (e.g., a die-cast part) acquired by the camera 304. The shown image is merely illustrative (i.e., not a real image), being schematically represented as a line drawing for clarity. As shown, the extracted patch 402 includes defects 404a, 404b and 404c. Since the main anomaly detection neural network was trained only on images of nominal (defect-free) manufactured parts, any defects such as 404a, 404b and 404c appearing on the extracted patch 402 will not recognized by the main anomaly detection neural network. The reconstructed nominal part image would thereby exclude such defects (as being out-of-normal-distribution). Defects in the acquired image 306 may be revealed by comparing each extracted patch of the acquired image 306 (e.g., patch 402) to the respective reconstructed nominal part image, to detect an anomaly.

In one embodiment, the anomaly detector module 310 may determine a pixel-wise location of a defect based on a loss map, which is defined by a difference between the extracted patch of the acquired image and the reconstructed nominal part image. FIG. 4 shows an example of a loss map 406 corresponding to the extracted patch 402. According to an example technique, the loss map 406 may be generated by determining a pixel-wise anomaly score based on a reconstruction error between the extracted image patch 402 and the reconstructed nominal image corresponding to the patch 402, with higher scores representing more likely anomalies. Optionally, the residual map may be smoothed out by filtering. Subsequently, a binary segmentation may be carried out to identify the location of an anomaly. In the example shown in FIG. 4, the anomalies 408a, 408b and 408c in the loss map 406 indicate the location of the defects 404a, 404b and 404c respectively.

Figure 5:
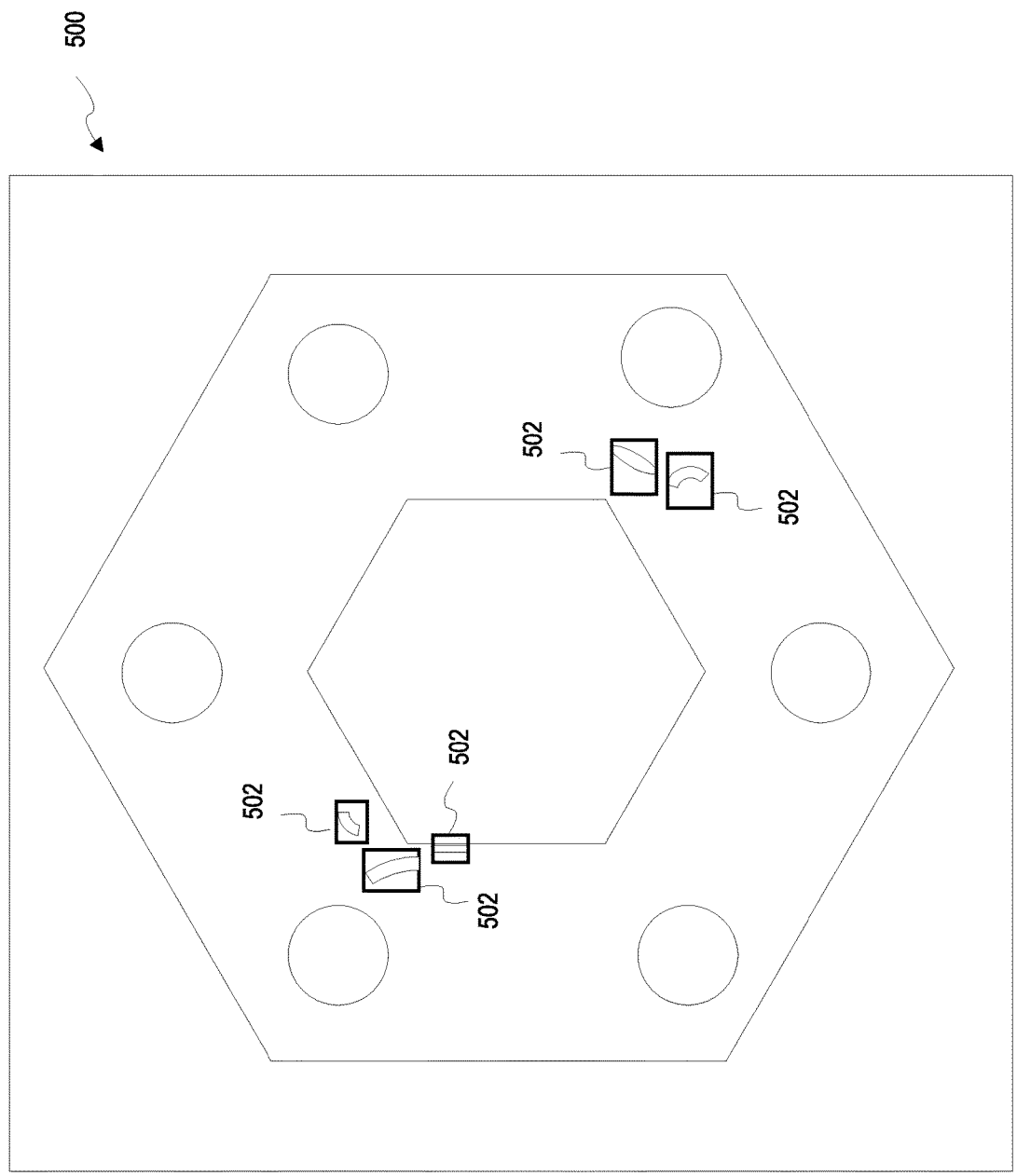
FIG. 5 schematically illustrates an example visualization of an output of the anomaly detector module.

The anomaly detector module 310 may localize identified defects on the actual acquired image 306 by overlaying each loss map on the respective patch of the image 306, stitching the extracted patches to re-create the whole image, and drawing bounding boxes around the determined locations of the defects (e.g., based on the loss maps) in whole image. FIG. 5 shows an example visualization of an output 500 of the anomaly detector module 310. The shown image is illustrative, being schematically represented as a line drawing. Herein, the defective regions, as synthetically generated by the anomaly detector module 310, are located by bounding boxes 502. Referring to FIG. 3, the output image 312 comprising the identified defects relevant information, including the presence and location of the identified defects, can then be visualized (e.g., as shown in FIG. 5) and displayed to an operator via a user interface 314, such as an HMI device, among others.

The disclosed embodiments thus provide a solution for automatically and reliably detecting defects in manufactured parts at an early stage in production. Based on the output of the anomaly detector module 310, appropriate control action may be executed. Examples of control action may include isolating a defective part from production, shutting down production to avoid a catastrophic event (e.g., defects are detected in a succession of formed parts), and so on. The control action may be executed automatically, semi-automatically, or manually, responsive to the output of the anomaly detector module 310, specifically, a positive defect detection in one or more manufactured parts in the production line 302. For example, in one embodiment, as shown in FIG. 3, the system 300 may include a field controller 316 for automatically executing a control action to control the production line 302 based on the output of the anomaly detector module 310. In embodiments, the field controller 316 may comprise or be integrated with automation system equipment such as PLCs (Programmable Logic Controllers), drives, etc. for executing the control action.

Figure 6:
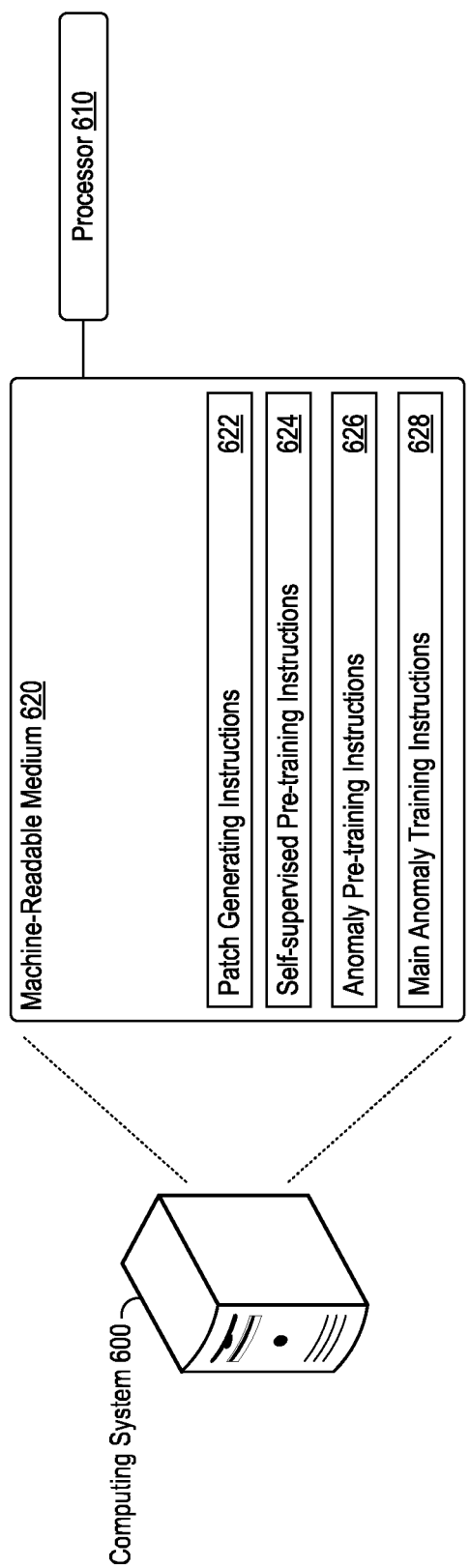
FIG. 6 illustrates a computing system that can support visual quality inspection of manufactured parts on a shop floor according to disclosed embodiments.

FIG. 6 shows an example of a computing system 600 that can support visual quality inspection of manufactured parts on a shop floor according to disclosed embodiments. In examples, the computing system 600 may be configured as a powerful multi-GPU workstation, among other types of computing devices. The computing system 600 includes at least one processor 610, which may take the form of a single or multiple processors. The processor(s) 610 may include a one or more CPUs, GPUs, microprocessors, or any hardware devices suitable for executing instructions stored on a memory comprising a machine-readable medium. The computing system 600 further includes a machine-readable medium 620. The machine-readable medium 620 may take the form of any non-transitory electronic, magnetic, optical, or other physical storage device that stores executable instructions, such as patch generating instructions 622, self-supervised pre-training instructions 624, anomaly pre-training 626 and main anomaly training instructions 628, as shown in FIG. 6. As such, the machine-readable medium 620 may be, for example, Random Access Memory (RAM) such as a dynamic RAM (DRAM), flash memory, spin-transfer torque memory, an Electrically-Erasable Programmable Read-Only Memory (EEPROM), a storage drive, an optical disk, and the like.

The computing system 600 may execute instructions stored on the machine-readable medium 620 through the processor(s) 610. Executing the instructions (e.g., the patch generating instructions 622, the self-supervised pre-training instructions 624, the anomaly pre-training 626 and the main anomaly training instructions 628) may cause the computing system 600 to perform any of the technical features described herein, including according to any of the features of the patch generator module 104, the self-supervised pre-trainer module 112, the anomaly pre-trainer module 118 and the main anomaly trainer module 122 described above.

The systems, methods, devices, and logic described above, including the patch generator module 104, the self-supervised pre-trainer module 112, the anomaly pre-trainer module 118 and the main anomaly trainer module 122, may be implemented in many different ways in many different combinations of hardware, logic, circuitry, and executable instructions stored on a machine-readable medium. For example, these engines may include circuitry in a controller, a microprocessor, or an application specific integrated circuit (ASIC), or may be implemented with discrete logic or components, or a combination of other types of analog or digital circuitry, combined on a single integrated circuit or distributed among multiple integrated circuits. A product, such as a computer program product, may include a storage medium and machine-readable instructions stored on the medium, which when executed in an endpoint, computer system, or other device, cause the device to perform operations according to any of the description above, including according to any features of the patch generator module 104, the self-supervised pre-trainer module 112, the anomaly pre-trainer module 118 and the main anomaly trainer module 122. Computer readable program instructions described herein can be downloaded to respective computing/processing devices from a computer readable storage medium or to an external computer or external storage device via a network, for example, the Internet, a local area network, a wide area network and/or a wireless network.

The processing capability of the systems, devices, and engines described herein, including the patch generator module 104, the self-supervised pre-trainer module 112, the anomaly pre-trainer module 118 and the main anomaly trainer module 122 may be distributed among multiple system components, such as among multiple processors and memories, optionally including multiple distributed processing systems or cloud/network elements. Parameters, databases, and other data structures may be separately stored and managed, may be incorporated into a single memory or database, may be logically and physically organized in many different ways, and may be implemented in many ways, including data structures such as linked lists, hash tables, or implicit storage mechanisms. Programs may be parts (e.g., subroutines) of a single program, separate programs, distributed across several memories and processors, or implemented in many different ways, such as in a library (e.g., a shared library).

Although this disclosure has been described with reference to particular embodiments, it is to be understood that the embodiments and variations shown and described herein are for illustration purposes only. Modifications to the current design may be implemented by those skilled in the art, without departing from the scope of the patent claims.

What is claimed is:

1. A method for artificial intelligence-based visual quality inspection of parts manufactured on a shop floor, comprising:

acquiring a set of real images of nominal parts manufactured on the shop floor, executing a self-supervised pre-trainer module to pre-train a loss computation neural network in a self-supervised learning process using a first dataset created from the acquired set of real images, wherein the loss computation neural network is pre-trained on pretexts defined by real-world conditions pertaining to the shop floor, the first dataset being labeled by automatically extracting pretext-related information from image metadata, and executing a main anomaly trainer module to train a main anomaly detection neural network to reconstruct a nominal part image from an input manufactured part image in an unsupervised learning process using a second dataset created from the acquired set of real images, wherein the unsupervised learning process comprises using the main anomaly detection neural network for processing input images from the second dataset to output respective reconstructed images and measuring therefrom a reconstruction loss to be minimized, and wherein the reconstruction loss includes a perceptual loss that is measured by feeding each input image and the respective reconstructed image to the pre-trained loss computation neural network and computing a measure of the difference between feature representations of the input image and the respective reconstructed image at one or more layers of the pre-trained loss computation neural network.

2. The method according to claim 1, wherein an objective of the self-supervised pre-trainer module is generated using a combination of pretexts, the combination of pretexts defined by real-world conditions including environmental conditions and/or operational conditions and/or camera conditions pertaining to the shop floor.

3. The method according to claim 2, wherein pretexts are assigned respective difficulty scores, and the objective of the self-supervised pre-trainer module is generated by combining pretexts based on a specified overall difficulty score.

4. The method according to claim 1, wherein the loss computation neural network comprises a number of convolutional layers, and wherein the perceptual loss is measured by combining contributions from multiple levels of feature representations respectively at multiple convolutional layers of the pre-trained loss computation neural network.

5. The method according to claim 1, wherein the main anomaly detection neural network comprises an autoencoder architecture.

6. The method according to claim 1, wherein the reconstruction loss is measured by combining the perceptual loss with one or more per-pixel loss measures between the reconstructed image and the input image.

7. The method according to claim 6, wherein the one or more per-pixel loss measures includes a combination of a L1 loss measure, a L2 loss measure and a structural similarity index measure (SSIM) of the main anomaly detection neural network.

8. The method according to claim 1, further comprising executing a patch generator module to extract patches from individual whole images in the acquired set of real images, wherein the extracted patches comprise ordered positional embeddings extracted from individual whole images based on a specified number of rows and columns into which a whole image is to be divided, and wherein the ordered positional embeddings are used as images in the respective datasets for pre-training the loss computation neural network and for training the main anomaly detection neural network.

9. The method according to claim 8,
wherein the extracted patches further comprise overlap positional embeddings extracted from individual whole images based on a specified patch size and overlap degree, and
wherein the ordered and overlap positional embeddings are used as images in the respective datasets for pre-training the loss computation neural network and for training the main anomaly detection neural network.

10. The method according to claim 8,
wherein the extracted patches further comprise random positional embeddings extracted from individual whole images based on a specified patch size and number of patches,
wherein the method further comprises:
   executing an anomaly pre-trainer module to pre-train a candidate anomaly detection neural network in an unsupervised learning process using a third dataset comprising the extracted random positional embeddings, the candidate anomaly detection neural network having an identical architecture to the main anomaly detection neural network, and
   initializing the main anomaly detection neural network using weights of the pre-trained candidate anomaly detection neural network before executing the main anomaly trainer module to train the main anomaly detection neural network.

11. The method according to claim 1, comprising detecting a defect in a manufactured part on the shop floor by:
   acquiring an image of the manufactured part via a production line camera,
   providing a real time input image to an anomaly detector module comprising the trained main anomaly detection neural network, based on the acquired image of the manufactured part,
   processing the real time input image by the anomaly detector module using the trained main anomaly detection neural network, to reconstruct a nominal part image, and
   detecting an anomaly by the anomaly detector module based on measuring a difference between the real time input image and the reconstructed nominal part image.

12. The method according to claim 11, comprising determining a pixel-wise location of a defect based on a loss map between the real time input image and the reconstructed nominal part image.

13. A non-transitory computer-readable storage medium including instructions that, when processed by a computing system, configure the computing system to perform the method according to claim 1.

14. A computing system for supporting artificial intelligence-based visual quality inspection of parts manufactured on a shop floor, comprising:
   one or more processors, and
   a memory storing algorithmic modules executable by the one or more processors, the algorithmic modules comprising:
      a self-supervised pre-trainer module configured to pre-train a loss computation neural network in a self-supervised learning process using a first dataset created from an acquired set of real images of nominal parts manufactured on the shop floor, wherein the loss computation neural network is pre-trained on pretexts defined by real-world conditions pertaining to the shop floor, the first dataset being labeled by automatically extracting pretext-related information from image metadata, and
      a main anomaly trainer module configured to train a main anomaly detection neural network to reconstruct a nominal part image from an input manufactured part image in an unsupervised learning process using a second dataset created from the acquired set of real images of nominal parts manufactured on the shop floor,
         wherein the main anomaly trainer module is configured use the main anomaly detection neural network for processing input images from the second dataset to output respective reconstructed images and measuring therefrom a reconstruction loss to be minimized, and
         wherein the reconstruction loss includes a perceptual loss that is measured by feeding each input image and the respective reconstructed image to the pre-trained loss computation neural network and computing a measure of the difference between feature representations of the input image and the respective reconstructed image at one or more layers of the pre-trained loss computation neural network.

15. The computing system according to claim 14, wherein the self-supervised pre-trainer module is configured to pre-train the loss computation neural network based on an objective generated using a combination of pretexts, the combination of pretexts defined by real-world conditions including environmental conditions and/or operational conditions and/or camera conditions pertaining to the shop floor.

16. The computing system according to claim 14, wherein the loss computation neural network comprises convolutional layers, and wherein the main anomaly trainer module is configured to measure the perceptual loss by combining contributions from multiple levels of feature representations respectively at multiple convolutional layers of the pre-trained loss computation neural network.

17. The computing system according to claim 14, wherein the main anomaly trainer module is configured to measure the reconstruction loss by combining the perceptual loss with one or more per-pixel loss measures between the reconstructed image and the input image.

18. The computing system according to claim 14, further comprising a patch generator module configured to extract patches from individual whole images in the acquired set of real images,
wherein the extracted patches comprise ordered positional embeddings extracted from individual whole images based on a specified number of rows and columns into which a whole image is to be divided, and
wherein the self-supervised pre-trainer module and the main anomaly trainer module are configured to use the ordered positional embeddings as images in the respective first and second datasets.

19. The computing system according to claim 18,
wherein the extracted patches further comprise overlap positional embeddings extracted from individual whole images based on a specified patch size and overlap degree, and
wherein the self-supervised pre-trainer module and the main anomaly trainer module are configured to use the ordered and overlap positional embeddings as images in the respective first and second datasets.

20. The computing system according to claim 18,
wherein the extracted patches further comprise random positional embeddings extracted from individual whole images based on a specified patch size and number of patches,
wherein the computing system further comprises an anomaly pre-trainer module configured to pre-train a candidate anomaly detection neural network in an unsupervised learning process using a third dataset comprising the extracted random positional embeddings, the candidate anomaly detection neural network having an identical architecture to the main anomaly detection neural network, and
wherein the main anomaly detection neural network is initialized using weights of the pre-trained candidate anomaly detection neural network before executing the main anomaly trainer module to train the main anomaly detection neural network.

\* \* \* \* \*